C. R. VERONEE

Animal-Trap.

No. 113,371.                                    Patented Apr. 4. 1871.

Witnesses:                                      Inventor:

United States Patent Office.

CORNELIUS B. VERONEE, OF ATHENS, GEORGIA.

Letters Patent No. 113,371, dated April 4, 1871.

IMPROVEMENT IN ANIMAL-TRAPS.

The Schedule referred to in these Letters Patent and making part of the same.

*To all whom it may concern:*

Be it known that I, CORNELIUS B. VERONEE, of Athens, in the county of Clark and State of Georgia, have invented a new and useful Improvement in Animal-Traps; and I do hereby declare that the following is a full, clear, and exact description thereof, which will enable others skilled in the art to make and use the same, reference being had to the accompanying drawing forming part of this specification.

This invention relates to a new and useful improvement in traps for catching rats and other animals; and It consists in the arrangement of a trap-door in the bottom of a suitable box, and over a barrel or other vessel, and operating as hereinafter more fully described.

In the accompanying drawing—

Similar letters of reference indicate corresponding parts.

A is the barrel or other vessel upon which the trap is placed, and which receives the animals that pass through the trap.

B is a box, of any convenient size and form, which is open at the bottom and on one side.

The box is placed upon the platform or plate C, which has an aperture through it corresponding in size to the size of the box.

This plate or platform C may be the head of a barrel or hogshead, or the top of any other suitable vessel.

D is the door, which is pivoted near its center at the point $e$, but with the back portion F the heaviest, so that it will be self-closing, and, consequently, self-setting.

Figure 1:
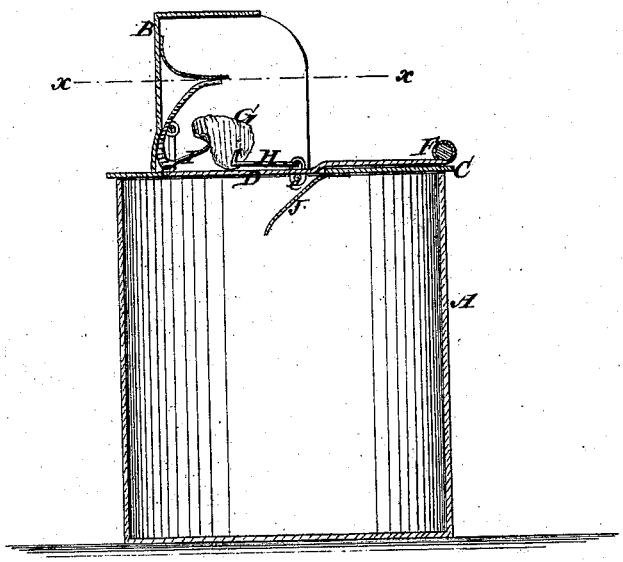
Figure 1 represents a vertical central section of the whole arrangement.
Figure 2:
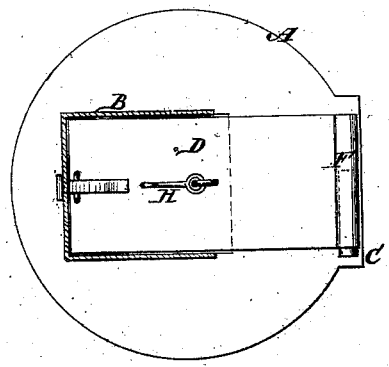
Figure 2 is a horizontal section of fig. 1 on the line $x\ x$.

G represents the bait, which is confined to the top of the door by the hooks H I, as seen in fig. 1.

In his effort to reach the bait the rat or other animal enters the open side of the box, and, treading upon the door forward of the pivots, the door of course tips up and delivers him into the vessel A, while the weighted door drops back to its original position ready for another animal.

I do not confine myself to any particular mode of securing the bait. Instead of confining it to the door, it may, perhaps, be confined to the side of the box, or in some other manner within the box, where it will produce the desired result; but I prefer the arrangement shown.

J is a stop-spring, which prevents the door from reaching a vertical position as the animal slides from it into the vessel below.

Having thus described my invention,

I claim as new and desire to secure by Letters Patent—

The open-bottomed open-sided box B and the trap-door D, pivoted at $e$ and weighted at F, combined as described, and arranged on the open-topped receiving-vessel A, as and for the purpose described.

CORNELIUS B. VERONEE.

Witnesses:
JAMES C. WILKINS,
P. A. SUMMEY.